UNITED STATES PATENT OFFICE 2,042,810

COMPLEX METAL COMPOUNDS OF DISAZO-DYESTUFFS

Fritz Straub and Hans Mayer, Basel, Switzerland, assignors to the firm of Society of Chemical Industry in Basle, Basel, Switzerland No Drawing. Application January 23, 1935, Serial No. 3,188. In Switzerland August 11, 1934

3 Claims. (Cl. 260—12)

It has been found that dyestuffs containing metal in complex union can be produced by treating with agents yielding metal disazo-dyestuffs of the general formula

(R—N=N—R$_1$—N=N—R)SO$_3$H in which both R's represent aryl-radicals, of which at least one contains a lake-forming group, and R$_1$ represents an aryl-radical containing at least two hydroxyl-groups.

The parent disazo-dyestuffs complying with the foregoing formula can be obtained by coupling two different diazo-compounds, of which at least one contains a lake-forming group and only the one contains a sulfo-group, with, for example, 1,3-dihydroxybenzene, 1,3-dihydroxybenzene-4-carboxylic acid, 1,3-dihydroxybenzene-5-carboxylic acid, a dihydroxynaphthalene such as, for example, 1,5-dihydroxynaphthalene or 2,6-dihydroxynaphthalene or the like; or a nitro-, alkyl- or halogen-substitution product of one of these, so far as such substitution products have a tendency to couple twice. Suitable diazo-compounds are, for instance, the diazo-compounds of amines of the benzene and naphthalene series, which in ortho-position to the diazo-group contain a hydroxyl-, carboxyl- or alkoxy-group, or which contain the salicylic acid grouping. Such diazo-compounds are, for example, those of aminobenzene, aminonaphthalene, ortho-amino-phenol, ortho-amino-naphthol, ortho-aminoalkoxybenzene, ortho-aminoalkoxynaphthalene, anthranilic acids, ortho-aminonaphthalene-carboxylic acids, aminosalicylic acids, as well as the sulfonic acid, nitro-, alkyl- and halogen substitution products of these bodies.

The treatment of the disazo-dyestuffs corresponding with the foregoing formula with the agent which yields metal, for instance, an agent capable of yielding chromium, copper, iron, aluminium, cobalt, nickel, manganese, zinc, vanadium, or titanium, may be conducted in acid, neutral or alkaline medium with or without suitable additions, for instance a salt of an inorganic or an organic acid or a free organic acid, in presence or absence of an organic solvent, for instance alcohol or pyridine, and in an open vessel or under pressure. Furthermore, there may be used only one agent yielding metal or two or more such agents and in the latter case they may be used, simultaneously or in succession, to act upon the disazo-dyestuff or on a mixture of these disazo-dyestuffs. The treatment with the agent yielding metal may be so conducted that the dyestuff produced contains one metal atom for each lake-forming group of the dyestuff molecule, or less than one such atom or more than one such atom. Finally, the treatment with the agent yielding metal may be conducted simultaneously with the production of the dyestuff and in many cases not only in substance but also on the fibre or in the dye-bath.

A variation of the process consists in first treating with the agent yielding metal the monoazo-dyestuff R—N=N—R$_1$, containing the lake-forming groups and formed by coupling the diazo-compound containing lake-forming groups with the aryl-derivative containing at least two hydroxyl-groups and capable of coupling twice, and thereupon conducting the second coupling to produce the disazo-dyestuff. For this second coupling there may also be used a complex metal compound derived from a mixture of mono-hydroxyazodyestuffs.

This modified process can be further developed by treating with the agent yielding metal the dyestuff obtained, particularly if in the second coupling also there has been used a component which contains lake-forming groups. Also in a further variation one or more agents yielding metal may be brought into use, as well as dyestuffs made which contain for each lake-forming group of the dyestuff molecule one or less than one or more than one atom of metal.

The complex metal compounds of this invention may be used for dyeing animal fibres, such as wool or silk; they are particularly suitable for dyeing leather tanned in any desired manner, for instance chromed leather or vegetable tanned leathers, the dyeing being uniform and of very fast tints.

The following examples illustrate the invention, the parts being by weight:—

Example 1

31.6 parts of the iron compound of the dyestuff from diazotized 4-nitro-2-amino-1-phenol and 1,3-dihydroxybenzene (obtained by the process described in specification No. 1,895,559) are dissolved in the cold in 200 parts of water and 27 parts of caustic soda solution of 30 per cent. strength, and the solution is coupled, at 10–12° C., with the diazo-compound obtained in the usual manner from 20.9 parts of 1-aminobenzene-4-sulfonic acid. After stirring for 4–6 hours the coupling is complete. The whole is neutralized with dilute hydrochloric acid and the dyestuff of the formula

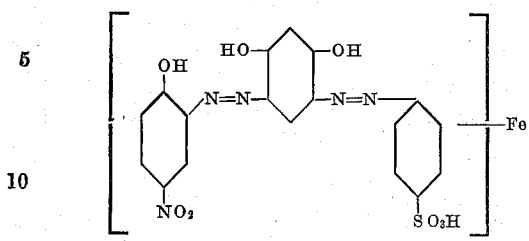

salted out. When dry the dyestuff is a black powder freely soluble in water to a brown yellow solution. In concentrated sulfuric acid it dissolves to a brownish orange solution. In a bath acid with formic acid it dyes vegetable tanned leather greenish yellow-brown. In a neutral bath it dyes chrome-tanned leather also greenish yellow-brown of excellent properties of fastness.

If instead of the 1-aminobenzene-4-sulfonic acid there is used 2-nitro-1-aminobenzene-4-sulfonic acid or 4-nitro-2-amino-1-phenol-6-sulfonic acid there are obtained yellow brown to dark brown dyeing dyestuffs having similar properties of fastness.

If, instead of the iron-compound specified in the first paragraph of this example there is used, for instance, the nickel or cobalt compound or even a compound containing one, two or more metals, there are obtained dyestuffs which dye leather brown to red to violet tints.

Example 2

34 parts of the manganese compound of the dyestuff from diazotized 4-nitro-2-amino-1-phenol and 1,3-dihydroxybenzene (obtainable by the process described in specification No. 1,895,559) are dissolved in 300 parts of water and 27 parts of caustic soda solution of 30 per cent. strength, and the solution is mixed with the neutralized diazo-compound from 23.4 parts of 4-nitro-2-amino-1-phenol-6-sulfonic acid, the mixture being stirred at 10–15° C. for 10–12 hours. At the end of this time the coupling is complete. The mixture is now heated to 60° C. and mixed with 11.5 parts of hydrochloric acid of 30 per cent. strength and 16.2 parts of ferric chloride in the form of an aqueous solution of 20 per cent. strength. The whole is heated to boiling and kept at 102–104° C. for 3 hours in a reflux apparatus, while cooling. 100 parts of common salt are now added, the mass allowed to cool, the dyestuff of the formula

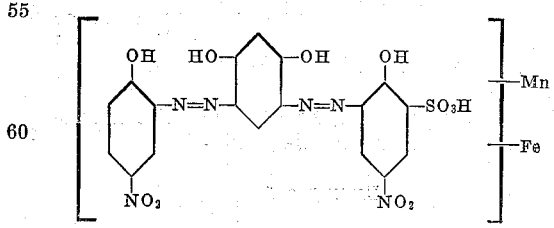

is filtered and the solid matter dried at a moderate temperature. There is obtained a brown-black powder, freely soluble in water to a yellow-brown solution and soluble in concentrated sulfuric acid to a red-orange solution. In a bath acid with formic acid the dyestuff dyes vegetable tanned leather, or in a neutral bath chrome leather, olive dark brown dyeings fast to light.

Dyestuffs which dye similar olive brown as well as brown red or Bordeaux tints are obtained by using instead of 4-nitro-2-amino-1-phenol-6-sulfonic acid other ortho-aminophenol-monosulfonic acids, such as 6-nitro-2-amino-1-phenol-4-sulfonic acid or 4-chloro-2-amino-1-phenol-6-sulfonic acid, or instead of manganese or iron or instead of manganese and iron, other metals, such as nickel, copper, cobalt, zinc, aluminum, chromium or even two or more metals.

Example 3

30 parts of the iron-compound of the dyestuff from diazotized 4-chloro-2-amino-1-phenol and 1,3-dihydroxybenzene (obtainable by the process described in Example 4 of the specification No. 1,895,559) are dissolved in 150 parts of water and 27 parts of caustic soda solution of 30 per cent. strength, and the solution is stirred at 10–18° C. with a neutralized diazo-compound from 23.4 parts of 4-nitro-2-amino-1-phenol-6-sulfonic acid for 10–15 hours. At the end of this time the coupling is complete. The whole is warmed and there are added at 60° C. 11.5 parts of hydrochloric acid of 30 per cent. strength and at boiling point 25 parts of crystallized copper sulfate dissolved in 100 parts of water. After boiling for 4 hours 100 parts of common salt are added and the whole is allowed to cool, whereupon the dyestuff of the formula

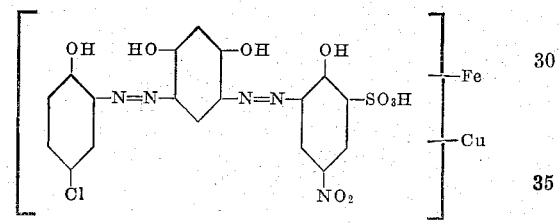

is completely separated. After filtering and drying there is obtained a dark brown powder which dissolves freely in water to an orange brown solution and in concentrated sulfuric acid to a brownish-orange solution. The dyestuff dyes chrome-tanned leather in a neutral bath red-brown tints of excellent properties of fastness.

If instead of copper, nickel is used there is obtained a dyestuff dyeing yellowish-brown.

A similar dyestuff is obtained when instead of the aforesaid iron-compound of the dyestuff from diazotized 4-chloro-2-amino-1-phenol and resorcinol there are used 13.8 parts of the dyestuff from diazotized 4-nitro-2-amino-1-phenol and 1,3-dihydroxybenzene, as well as 13.2 parts of the dyestuff from diazotized 4-chloro-2-amino-1-phenol and 1,3-dihydroxybenzene, ferric chloride being used as the agent yielding metal, for introducing metal into both the dyestuffs and then coupling with the diazo-compound from 23.4 parts of 4-nitro-2-amino-1-phenol-6-sulfonic acid and treating the product with 25 parts of crystallized copper sulfate.

Example 4

31.6 parts of the iron-compound from diazotized 4-nitro-2-amino-1-phenol and 1,3-dihydroxybenzene, made by the process described in specification No. 1,895,559, are dissolved in the cold in 200 parts of water and 27 parts of caustic soda solution of 30 per cent. strength, and the solution is stirred for 10–12 hours at 10–18° C. with the neutralized diazo-compound from 22.3 parts of 4-chloro-2-amino-1-phenol-6-sulfonic acid. When coupling is complete the mixture is heated, mixed at 70° C. with 11.5 parts of hydrochloric acid of 30 per cent. strength and, at boiling point, with 60 parts by volume of a solution of chromium sulfate containing 15.2 per cent. of $Cr_2O_3$, and heated in a reflux apparatus for 24 hours. The mass is now allowed to cool and the dyestuff of the formula

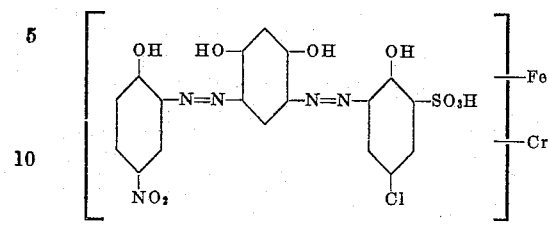

precipitated by addition of 120 parts of common salt. After filtration and drying there is obtained a dark brown powder which dissolves freely in water to a Bordeaux red solution and in concentrated sulfuric acid to a dirty yellow red solution. The dyestuff dyes vegetable tanned leather in a bath acid with formic acid fast wine-red tints, and chrome tanned leather in a neutral bath violet-brown to chocolate brown, fast tints.

If in this example 4-nitro-2-amino-1-phenol-6-sulfonic acid is substituted for the 4-chloro-2-amino-1-phenol-6-sulfonic acid there is obtained a similar dyestuff which, on treatment with agents yielding copper, gives red brown tints, or when treated with agents yielding copper and iron, according to the ratio of the mixture, red brown to reddish dark brown tints, and when treated with agents yielding nickel greenish yellow brown tints, on leather.

*Example 5*

32 parts of the cobalt compound of the dyestuff from diazotized 4-nitro-2-amino-1-phenol and 1,3-dihydroxybenzene, made by the process described in specification No. 1,895,559, are dissolved in the cold in 100 parts of water and 27 parts of caustic soda solution of 30 per cent. strength, and the solution is mixed with a diazo-solution, neutralized in sodium carbonate, from 22.3 parts of 4-chloro-2-amino-1-phenol-6-sulfonic acid. After the mixture has been stirred for 12 hours at 10–15° C., coupling is complete. The mixture is now heated to 60° C. and mixed with a solution of 12.5 parts of crystallized copper sulfate, 7.5 parts of tartaric acid, 60 parts of water and 40 parts of caustic soda solution of 30 per cent. strength, this solution being alkaline to phenolphthalein. The temperature of the mixture is maintained for 2 hours at 70–75° C. while continuously stirring. It is then allowed to cool, made acid to litmus with 34.5 parts of hydrochloric acid of 30 per cent. strength and mixed with 100 parts of common salt to precipitate the dyestuff. After filtering and drying the solid material there is obtained a red-brown powder which dissolves freely in water to a brownish-red solution and in concentrated sulfuric acid to a brownish red solution; it dyes leather fast Russia leather red tints.

Similar dyestuffs are obtained when instead of the cobalt compound of the mono-azo-dyestuff metal-compounds which may contain one or several metals are used; such dyestuffs are produced when two or more mono-ortho-hydroxyazo-dyestuffs are jointly treated with one or more metals by the process described in specification No. 1,887,602 in an acid, neutral, or alkaline medium, and thereupon the mixture is further coupled with one or more ortho-hydroxydiazo-compounds, and finally again converted into complex metal compounds by means of one or more agents yielding metal, in acid, neutral or alkaline medium.

*Example 6*

To a solution cooled to 0° C. of 8.1 parts of ferric chloride in 40 parts of water are added 34 parts of caustic soda solution of 30 per cent. strength and a solution of 11.5 parts of 1,3-dihydroxybenzene in 50 parts of water, and the mixture is cooled to 0° C. There is then added the diazo-compound from 15.4 parts of 4-nitro-2-amino-1-phenol made in the usual manner and neutralized with dilute sodium carbonate solution; the coupling continues for 2 hours at 5–8° C. The whole is now heated to 90° C. kept for 1 hour at 90–95° C. and boiled for half-an-hour, whereby the iron compound of the dyestuff is produced. After cooling to 5° C. a further 13.4 parts of caustic soda solution of 30 per cent. strength are added and then the diazonium solution neutralized with dilute sodium carbonate made from 23.4 parts of 6-nitro-2-amino-1-phenol-4-sulfonic acid. After stirring for 10–15 hours at 10–12° C. the coupling is complete. The whole is heated to 70° C., 11.5 parts of hydrochloric acid of 30 per cent. strength are added and, after further heating at 90° C., a solution of 12.5 parts of crystallized copper sulfate and 8.1 parts of ferric chloride in 80 parts of water. The production of a metal compound occurs somewhat quickly and is completed by boiling in a reflux apparatus for 6 hours. When the mass is cooled, the dyestuff of the formula

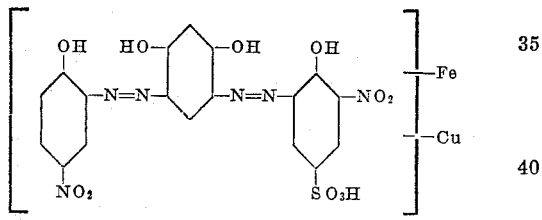

is salted out by means of 100 parts of common salt, filtered and dried at a moderate temperature. There is obtained a brown-black powder, freely soluble in water to a yellow brown solution and in concentrated sulfuric acid to a brown orange solution; it dyes chrome tanned leather in a neutral bath reddish brown tints.

If instead of 4-nitro-2-amino-1-phenol there is used a mixture of, for example, 4-nitro-2-amino-1-phenol and 4-chloro-2-amino-1-phenol, or instead of the 6-nitro-2-amino-1-phenol-4-sulfonic acid the 4-nitro-2-amino-1-phenol-6-sulfonic acid, or a mixture of these two monosulfonic acids there is obtained a similar dyestuff.

*Example 7*

To a solution cooled to 0° C. of 8.1 parts of ferric chloride in 40 parts of water there are added 34 parts of caustic soda solution of 30 per cent strength and then a solution of 11.5 parts of 1,3-dihydroxybenzene in 50 parts of water, and the mixture is cooled to 0° C. Into this mixture there is run the diazo-compound from 15.4 parts of 4-nitro-2-amino-1-phenol, made in the usual manner and neutralized with dilute sodium carbonate solution, and coupling continues for 2 hours at 5–8° C. Then a further 13.4 parts of caustic soda solution of 30 per cent strength are added, and the whole is mixed with the diazo-solution made from 23.4 parts of 4-nitro-2-amino-1-phenol-6-sulfonic acid and neutralized. After stirring for 10–15 hours at 10–18° C. the formation of the disazo-dyestuff is complete. The whole is warmed to 40° C. mixed with a suspension of ferric hydroxide obtained by precipitating the solution with 8.1 parts of ferric chloride in 60 parts of water with 20 parts of caustic soda solution of 30 per cent strength in the cold and is then further heated for 2 hours at 60–70° C., and for 1 hour to boiling, in a reflux apparatus. When the solution is cooled it is neutralized by means of 23 parts of hydrochloric acid of 30 per cent strength and the dyestuff is salted out in the usual manner. After filtration and drying it is a brown black powder, soluble in water to an olive brown solution and in concentrated sulfuric acid to a brown orange solution.

In a bath acid with formic acid it dyes vegetable-tanned leather olive brown, fast tints and in a neutral bath chrome-tanned leather the same tints.

Instead of 4-nitro-2-amino-1-phenol there may be used other 2-amino-1-phenols or even mixtures thereof.

Example 8

19.9 parts of 4,6-dinitro-2-amino-1-phenol are dissolved in 200 parts of hot water. The solution is mixed with 29 parts of hydrochloric acid of 30 per cent strength and ice is added, and at 15–20° C. diazotized with 6.9 parts of sodium nitrite in the usual manner. The diazo-compound is neutralized at 5° C. with dilute sodium carbonate solution and then there is run in a cooled solution of 11.5 parts of 1,3-dihydroxybenzene in 100 parts of water and 13.4 parts of caustic soda solution of 30 per cent strength. The hole is stirred for 2 hours at 5–10° C. Another 13.4 parts of caustic soda solution of 30 per cent strength are added and then a diazo-solution from 21.7 parts of 4-sulfo-2-amino-1-benzoic acid prepared in the usual manner and neutralized with dilute sodium carbonate solution. Coupling occurs at 10–17° C. in about 10 hours. When this is complete the mixture is heated to 60° C., 11.5 parts of hydrochloric acid of 30 per cent strength are added and then 32.4 parts of ferric chloride dissolved in 100 parts of water, and the whole is boiled for 12 hours in a reflux apparatus. Neutralization with sodium carbonate and salting out the dyestuff of the formula

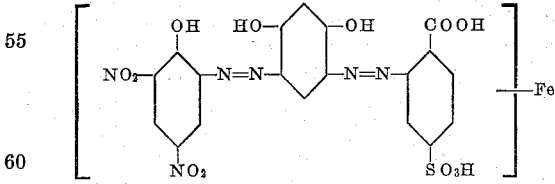

with 100 parts of common salt follow. The dry dyestuff is a brown black powder, soluble in water to a greenish-yellow solution and in concentrated sulfuric acid to a brown orange solution; it dyes leather olive brown tints of very good fastness.

Dyestuffs of similar dyeing properties are obtained if instead of the sulfo-amino-benzoic acid there is used, for example, a chlorosulfoaminobenzoic acid, or instead of the 4,6-dinitro-2-amino-1-phenol the 4- or 5-nitro-2-amino-1-phenol or the 6-nitro-4-chloro-2-amino-1-phenol and 6-chloro-4-nitro-2-amino-1-phenol, or instead of the ferric chloride other agents yielding metal, such as an agent yielding copper, cobalt, nickel, manganese, aluminium or chromium, or mixtures of these agents yielding metal.

Example 9

15.4 parts of 4-nitro-2-amino-1-phenol are diazotized in the usual manner with 6.9 parts of sodium nitrite and the diazo-compound neutralized with sodium carbonate is coupled at 5–10° C. with 11.5 parts of 1,3-dihydroxybenzene in 50 parts of water, and 13.4 parts of caustic soda solution of 30 per cent strength. After stirring for 2 hours another 13.4 parts of caustic soda solution of 30 per cent strength are added and then a diazo-solution made from 23.4 parts of 4-nitro-2-amino-1-phenol-6-sulfonic acid in the usual manner and neutralized with sodium carbonate. When coupling is complete, which means in about 10 hours at 10–15° C., the whole is heated to 60° C., mixed with 11.5 parts of hydrochloric acid of 30 per cent strength and then with 32.4 parts of ferric chloride and 25 parts of crystallized copper sulfate dissolved in 200 parts of water; boiling in a reflux apparatus for 4 hours follows. After cooling, 100 parts of common salt are added, the liquid is neutralized with sodium carbonate solution, filtered and the solid matter dried at a moderate temperature. The dyestuff is a brown-black powder freely soluble in water to a yellow-brown solution and in concentrated sulfuric acid to a brown orange solution. It dyes vegetable-tanned leather in a bath acid with formic acid reddish-brown tints and chrome-tanned leather in a neutral bath reddish dark brown, fast tints.

If, instead of the agent yielding copper there is added an agent yielding nickel or chromium or cobalt or manganese, there is obtained a dyestuff which dyes yellowish brown or red brown or reddish brown or olive brown, respectively. The diazo-components may be used in the reverse order and a similar dyestuff thereby obtained.

Example 10

22.3 parts of 4-chloro-2-amino-1-phenol-6-sulfonic acid are diazotized in the usual manner with 6.9 parts of sodium nitrite; the solution is neutralized with sodium carbonate and coupled at 5–10° C. with a solution of 11.5 parts of 1,3-dihydroxybenzene in 13.4 parts of caustic soda solution of 30 per cent. strength and 50 parts of water. When the formation of dyestuff is finished there are added 13.4 parts of caustic soda solution and the neutralized diazo-solution from 14.3 parts of 4-chloro-2-amino-1-phenol and the whole is stirred for 10–12 hours at 10–18° C. After completion of the coupling the mixture is heated to 60° C. and a solution of 9.4 parts of crystallized cobalt sulfate, 10 parts of crystallized zinc sulfate, 5.7 parts of aluminium sulfate, 50 parts of water, 7.5 parts of tartaric acid and 54 parts of caustic soda solution of 30 per cent. strength is added, the whole being kept for 2 hours at 65–70° C., and thereafter at 70–75° C. for a further 2 hours. After cooling, the whole is neutralized with 34.5 parts of hydrochloric acid of 30 per cent. strength and the dyestuff of the formula

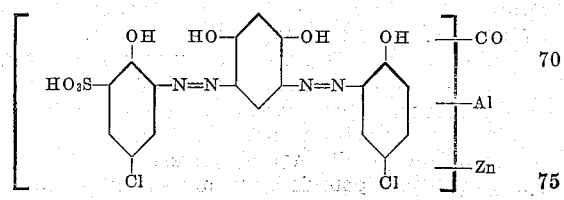

salted out by addition of 100 parts of common salt. After filtration and drying there is obtained a red-brown powder which dissolves in water to a brownish red-orange solution and in concentrated sulfuric acid to a brown orange solution. It dyes chrome-tanned leather in a neutral bath Bordeaux red tints of very good properties of fastness.

*Example 11*

25 parts of crystallized copper sulfate and 28.2 parts of crystallized nickel sulfate are dissolved in 100 parts of water and there are added 80 parts of caustic soda solution of 30 per cent. strength at 5–10° C. and 11.5 parts of 1,3-dihydroxybenzene, dissolved in 60 parts of water. There is then run in the diazo-solution made from a mixture of 15.4 parts of 5-nitro-2-amino-1-phenol and 23.4 parts of 6-nitro-2-amino-1-phenol-4-sulfonic acid, made in the usual manner and neutralized with dilute sodium carbonate solution; the coupling occupies 8–12 hours at 10–12° C. When the formation of dyestuff is complete the mixture is heated and, at 60° C., there are added 60 parts of hydrochloric acid of 30 per cent. strength and the whole is heated to boiling in a reflux apparatus for 6 hours. The dyestuff of the formula

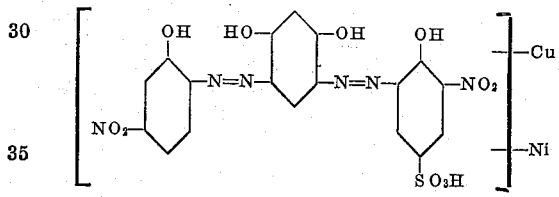

is then precipitated by means of 80 parts of common salt, filtered and dried. It is a reddish-brown powder, freely soluble in water to a cherry red solution, and in concentrated sulfuric acid to a brown-red solution. It dyes leather Bordeaux red, very fast tints.

Similar dyestuffs are obtained by varying the ratio to each other of the diazo-components or by coupling instead of two, three or more different diazo-components in the presence of one or more metals and finishing the formation of the metal compound in neutral or acid medium.

*Example 12*

12 parts of ferric chloride and 6.2 parts of crystallized copper sulfate are dissolved in 80 parts of water; the solution is neutralized at 5–10° C. with 53 parts of caustic soda solution of 30 per cent. strength, and is then mixed with a solution of 11.5 parts of 1,3-dihydroxybenzene. There is then run in a mixture of the neutralized diazo-compounds made in the usual way and neutralized in dilute sodium carbonate solution, from 15.4 parts of 4-nitro-2-amino-1-phenol and 23.4 parts of 4-nitro-2-amino-1-phenol-6-sulfonic acid, and coupling is continued for about 12 hours at 10–15° C. When formation of the dyestuff is finished the whole is heated within 1 hour to boiling and then boiled in a reflux apparatus for 1 hour. It is then allowed to cool, neutralized with 23 parts of hydrochloric acid of 30 per cent. strength and the dyestuff is salted out by means of 100 parts of common salt. When filtered and dried the dyestuff is an olive black powder, freely soluble in water to a greenish yellow-brown solution and in concentrated sulfuric acid to a brownish orange solution; it dyes leather olive dark brown, fast tints.

By changing the ratio to each other of the agents yielding metal in the favor of copper, there are obtained products which dye reddish dark brown tints. By exchanging the copper for nickel there is produced a dyestuff dyeing yellow brown. If instead of 4-nitro-2-amino-1-phenol-6-sulfonic acid, the 6-nitro-2-amino-1-phenol-4-sulfonic acid or the 4-chloro-2-amino-1-phenol-6-sulfonic acid is used, there are produced dyestuffs dyeing redder tints.

*Example 13*

18.8 parts of 4-sulfamino-2-amino-1-phenol and 22.3 parts of 4-chloro-2-amino-1-phenol-6-sulfonic acid are diazotized in the usual manner with 13.8 parts of sodium nitrite and the diazo-solution, neutralized with dilute sodium carbonate solution, is run into a solution of 11.5 parts of 1,3-dihydroxy-benzene in 60 parts of water and 27 parts of caustic soda solution of 30 per cent. strength; coupling is continued for 10–12 hours at 8–15° C.; when formation of the dyestuff is complete, the whole is heated to 50° C., mixed with 11.5 parts of hydrochloric acid of 30 per cent, strength and then with a mixture of 12.5 parts of crystallized copper sulfate in 50 parts of water and 25 parts by volume of a chromium sulfate solution containing 15.2 per cent. of $Cr_2O_3$. Boiling for 20 hours in a reflux apparatus follows. When the mass is cold, the dyestuff of the formula

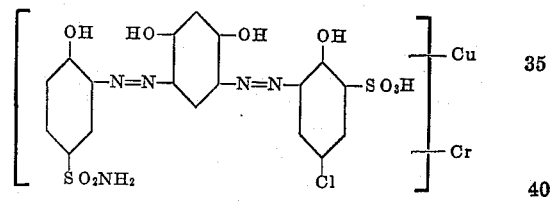

is salted out by addition of 120 parts of common salt, filtered and dried at a moderate temperature. There is obtained a red brown powder which dissolves in water to a gluish red solution and in concentrated sulfuric acid to a brownish orange solution. The dyestuff dyes vegetable-tanned leather in a bath acid with formic acid and chrome-tanned leather in a neutral bath a bluish-wine red, of very good properties of fastness.

Like dyestuffs are obtained when the ratio of the diazo-components to each other or of the agents yielding metal is varied or by using several diazo-components instead of only two.

*Example 14*

15.4 parts of 5-nitro-2-amino-1-phenol and 22.3 parts of 4-chloro-2-amino-1-phenol-6-sulfonic acid are separately diazotized in the usual manner and the diazo-compounds mixed, the mixture being neutralized with sodium carbonate and then receiving an addition of a solution of 11.5 parts of 1,3-dihydroxy-benzene in 60 parts of water and 27 parts of caustic soda solution of 30 per cent. strength. Coupling is continued for 10–12 hours at 10–15° C. When the formation of dyestuff is complete, the mass is warmed to 40° C., mixed with a solution of 28.1 parts of crystallized cobalt sulfate in 100 parts of water, 7.5 parts of tartaric acid and 54 parts of caustic soda solution are added and heating is continued for 2 hours at 70–75° C. and for 2 hours at 80–85°

C. The mass is then cooled, neturalized with 36 parts of hydrochloric acid of 30 per cent. strength and mixed with 150 parts of common salt to salt out the dyestuff of the formula

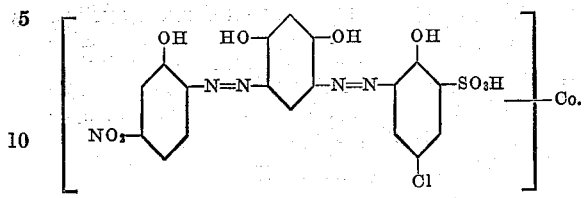

After filtration and drying the latter is a reddish brown powder, soluble in water to a Bordeaux red solution and in concentrated sulfuric acid to a brown red solution. It dyes leather bluish Bordeaux-red tints.

Instead of the cobalt other metals or mixtures of two or more metals, or instead of the diazo-components named others or the same in different proportions may be used, similar dyestuffs being obtained.

*Example 15*

Neutralized chromed leather (box-calf, chrome sides, glazed kid, full chrome sheep) is tumbled in a cask in 3-4 times its weight of water at 60° C.; while the cask is rotating there is run in through the hollow axle a solution of the azo-dyestuff containing manganese and iron, made from 4-nitro-2-amino-1-phenol→1,3-dihydroxybenzene←4-nitro-2-amino-1-phenol-6-sulfonic acid. After 40 minutes the dyestuff has been absorbed by the leather, whereupon the usual fatting follows. The leather thus dyed exhibits a full olive dark brown color which is very fast.

The dyeing may also be conducted by the brushing process with a neutral cold liquor.

*Example 16*

Well fulled vegetable-tanned sheep-, goat- or calf-leather is dyed as described in Example 15 with a solution of the azo-dyestuff containing cobalt and copper, made from 4-nitro-2-amino-1-phenol→1,3-dihydroxybenzene←4-chloro-2-amino-1-phenol-6-sulfonic acid. At the conclusion of the dyeing, formic acid amounting to half the weight of the dyestuff used is added and dyeing is continued for another 10-15 minutes. The leather is then rinsed. There is obtained a full, very fast Russia leather red.

What we claim is:

1. Complex metal compounds of the disazo-dyestuff of the formula

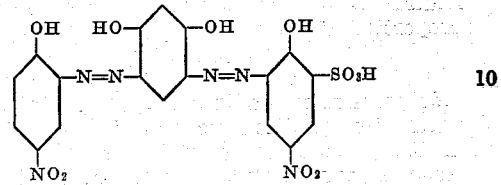

which are brown to black colored powders soluble in water and dyeing animal fibres, particularly leather, uniform brown to red tints of good fastness.

2. Disazo-dyestuffs containing iron and copper in complex union of the formula

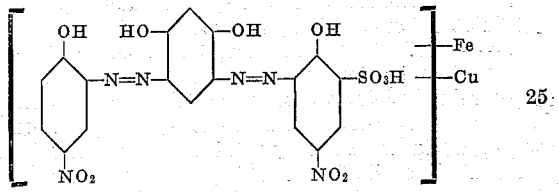

which are black powders soluble in water and dyeing animal fibers, particularly leather, uniform dark brown tints of good fastness.

3. Disazo-dyestuffs containing nickel and copper in complex union of the formula

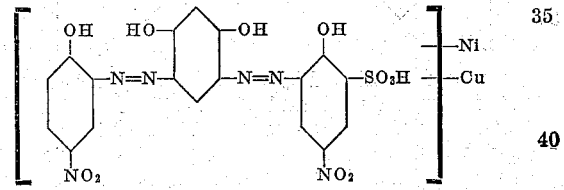

which are black powders soluble in water and dyeing animal fibers, particularly leather, uniform yellowish brown tints of good fastness.

FRITZ STRAUB.
HANS MAYER.